United States Patent [19]

Calderon et al.

[11] 3,867,361

[45] Feb. 18, 1975

[54] A PROCESS FOR THE POLYMERIZATION OF CYCLIC OLEFINS

[75] Inventors: Nissim Calderon; William Allen Judy, both of Akron, Ohio

[73] Assignee: The Goodyear Tire & Rubber Company, Akron, Ohio

[22] Filed: Mar. 28, 1966

[21] Appl. No.: 537,661

[52] U.S. Cl............ 260/88.2, 260/93.1, 252/429 R
[51] Int. Cl........ C08f 5/00, C08g 33/00, C08f 1/56
[58] Field of Search............ 260/80.78, 93.1, 94.9 C, 260/88.2; 252/429

[56] References Cited
UNITED STATES PATENTS

| | | | |
|---|---|---|---|
| 3,007,909 | 11/1961 | Raecke ........................ | 260/94.9 C |
| 3,007,909 | 11/1961 | Raecke et al. ......... | 260/94.9;94.9 C |
| 3,161,628 | 12/1964 | Dost............................ | 260/94.9 C |
| 3,161,628 | 12/1964 | Dost et al.............. | 260/94.9;94.9 C |
| 3,449,310 | 6/1969 | Dall'Asta et al................. | 260/93.1 |
| 3,597,406 | 8/1971 | Calderon .......................... | 260/93.1 |
| 3,781,257 | 12/1973 | Pampus et al. ................. | 260/80.78 |

OTHER PUBLICATIONS

Natta (I): Natta, Giulio, Stereospecific Polymerization of Cyclobutene, Die Makromoleculare Chemie, 69: p. 163-179, (1963).
Natta (II): Natta, Giulio, Stereospecific Ring Cleavage Homopolymerization of Cycloolefins and Structural Examination of the Resulting Homologous Series of Linear Crystalline Trans Polyalkenamers, Die Makromolekulare Chemie, 91: p. 87-106, (1966).
Scott, Calderon et al., Rubber Chemistry and Technology, 1971, Vol. 44, (No. 5), pages 1341-1349.
Symposium on Polymerization and Related Reaction by Metathesis, in Polymer Preprints, 1972, Vol. 13, No. 2, pages 874-923.
Nissim Calderon et al., J. of Polymer Science, A-1, 1967, Vol. 5, pages 2209-2217.
G. Natta & G. Dall'Asta in "Polymer Chemistry of Synthetic Elastomers" 1969, (Interscience) pages 703-726.
G. Natta & G. Dall'Asta, Angew. Chemie, International Edition, 1964, 3, pages 723-729.
G. Natta, G. Dall'Asta et al., Makromolekulare Chemie, 1963, 69, 163-179 and 1966, 91, 87-106.

*Primary Examiner*—Joseph L. Schofer
*Assistant Examiner*—A. L. Clingman
*Attorney, Agent, or Firm*—F. W. Brunner; J. Y. Clowney

[57] ABSTRACT

There is disclosed a polymerization process comprising polymerizing at least one unsaturated alicyclic compound selected from the group consisting of (1) unsaturated alicyclic compounds containing 4 or 5 carbon atoms in the cyclic ring and containing 1 carbon-to-carbon double bond in the cyclic ring, and (2) unsaturated alicyclic compounds containing at least 8 carbon atoms in the cyclic ring and containing at least 1 carbon-to-carbon double bond in the cyclic ring, by subjecting said alicyclic compounds to polymerization conditions in the presence of a catalyst system comprising (a) at least one organometallic compound wherein the metal is selected from the group consisting of Ia, IIa, IIb and IIIa of the Periodic Table of Elements, (b) at least one metal salt wherein the metal is selected from the group consisting of molybdenum and tungsten and (c) at least one compound of the general formula R—S—H wherein R is a radical selected from the group consisting of (1) hydrogen, (2) alkyl, (3) aryl, (4) aryalkyl, (5) alkaryl, (6) alkenyl, (7) thioalkyl, thioaryl and thioalkaryl and radicals of (2) through (6) wherein at least one hydrogen is substituted by thiol (SH) and wherein the relationship between these three catalyst components defined by (a), (b) and (c) are within a molar ratio of (b)/(c) ranging from 0.3/1 to at least 20/1 and the molar ratio of (a)/(b) is within the range from about 0.5/1 to at least about 15/1.

9 Claims, No Drawings

A PROCESS FOR THE POLYMERIZATION OF CYCLIC OLEFINS

This invention relates to a process for polymerizing unsaturated alicyclic compounds and to the products resulting therefrom. In its broad aspect the invention is directed to the preparation of polymers derived from unsaturated alicyclic compounds which contain at least one alicyclic ring structure containing at least two carbon atoms connected through a double bond.

The polymerization process of this invention may be used to prepare novel solid polymers. The properties and characteristics can be "tailor made" to fit a wide variety of uses and fields of application. The properties of the polymers resulting from the polymerization process of this invention can be varied over a wide range depending on (1) the particular unsaturated alicyclic monomer chosen to be polymerized, (2) the particular polymerization catalyst employed and (3) the particular polymerization conditions employed. The products resulting from the polymerization of this invention can be employed in a variety of applications; for example, they may be employed to produce finished rubber articles such as pneumatic tires, molded goods and the like or they may be materials which are useful to manufacture articles such as films and fibers. They may also be employed to form finished products by molding techniques.

This invention comprises polymerizing at least one unsaturated alicyclic compound selected from the group consisting of (1) unsaturated alicyclic compounds containing at least 4 and not more than 5 carbon atoms in the cyclic ring and containing 1 carbon-to-carbon double bond in the cyclic ring, and (2) unsaturated alicyclic compounds containing at least 8 carbon atoms in the cyclic ring and containing at least 1 carbon-to-carbon double bond in the cyclic ring, by subjecting said alicyclic compounds to polymerization conditions in the presence of a catalyst system comprising (a) at least one organo metallic compound wherein the metal is selected from the group consisting of Ia, IIa, IIb, and IIIa of the Periodic Table of Elements, (b) at least one metal salt wherein the metal is selected from the group consisting of molybdenum and tungsten and (c) at least one compound of the general formula R—Y—H wherein Y is selected from the group of sulfur and oxygen and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl, and thioalkaryl; (8) when Y is O, R is alkoxy, arylalkoxy, and alkaryloxy and radicals of (2) through (6) wherein at least one hydrogen is substituted by a material selected from thiol (SH) and hydroxyl (OH) groups. The Periodic Table of Elements referred to may be found in the Handbook of Chemistry and Physics, 44th Edition, April 1962 reprint, published by the Chemical Rubber Publication Company, Cleveland, Ohio, page 448.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organo-metallic compounds are compounds of lithium, sodium, magnesium, aluminum, zinc, and cadium, with aluminum being most preferred.

Representative examples of organo-metallic compounds useful as the first or (A) catalyst component of this invention are aluminum compounds having at least one aluminum-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum and the like; triarylaluminums such as tritolylaluminum, tribenzylaluminum, triphenylaluminum and the like; dialkylaluminum halides such as diethylaluminum chloride, di-n-propylaluminum chloride, diisobutylaluminum chloride, diethylaluminum bromide, diethylaluminum iodide, diethylaluminum fluoride and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like. Other organo-metallic compounds are also useful in the practice of this invention. Representative of such organo-metallic compounds are organo-alkali metal compounds such as alkyllithium compounds such as ethyllithium, n-butyllithium, t-butyllithium and the like; lithium-aluminum-tetraalkyls such as lithium-aluminumtetrabutyl, lithium-aluminum-tetraethyl and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide and the like; calcium, strontium and barium organo compounds such as barium alkyls and aryls; alkyls and aryls of Group IIb metals such as diethylzinc, diphenylzinc, ethylzinc chloride, diethylcadium, dibutylcadium and the like; Gringnard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminumsesquihalides.

The metal salts employed in the catalyst of this invention as the second or (B) catalyst component are selected from the salts of molybdenum and tungsten. Representatives of such salts include halides such as chlorides, bromides, iodides, and fluorides, which include compounds such as molybdenum pentachloride, molybdenum hexachloride, tungsten hexachloride, molybdenum pentabromide, molybdenum hexabromide, tungsten hexabromide, molybdenum pentaiodide, molybdenum hexaiodide, tungsten hexaiodide, molybdenum pentafluoride, molybdenum hexafluoride, and tungsten hexafluoride. Other representative salts are those of acetylacetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides representative of which are tungsten hexachloride and molybdenum pentachloride.

The third or (C) component of the catalyst system of this invention are compounds which respond to the formula R-Y-H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy, and (9) radicals of (2) through (6) wherein at least one hydrogen of R is substituted by at least one thiol (SH) or hydroxyl (OH) group.

Thus, the formula above defines a number of types of compounds. It defines water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials corresponding to the formula above are alcohols representative of which are methanol, ethanol, isopropanol, tertiarybutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl, and similar mercaptans, allyl mercaptan, thiophenol, 4-methylthiophenol, 4-mercaptophenol; the hydroperoxides such as cumyl hydroperoxide, tertiary butyl hydroperoxide; the hydrodisulfides such as cumyl hydrodisulfide, t-butyl hydrodisulfide; the polyalcohols such as ethylene glycol, glycerol, and similar polyglycols; catechol, resorcinol, hydroquinone, pyrogallol; the polymercaptans such as 1,3-propane dithiol, 1,4-dithiobenzene; the hydroxymercaptans or thioalcohols such as ethane-2-ol-1-thiol, 1-hydroxy-4-thiobenzene.

One of the unusual and distinguishing features of this invention is that the compounds of the formula R—Y—H, wherein R and Y have been previously defined, depending on the particular monomer employed, the particular organo-metallic compound and the particular Group VIb metal salt chosen and on the particular R—Y—H compound chosen, when employed in fairly substantial amounts are known to reduce drastically the activity of the polymerization reaction of this invention. For instance, materials such as alcohols have been utilized as shortstoppers in the polymerization reactions of conjugated diolefins with catalysts prepared by organo-metallic compounds and metal salts of Group VIb metals. However, an unexpectedly high activity of the catalyst of the present invention was found when compounds of the R—Y—H type are employed in relatively small amounts and added according to the teachings set forth in the present specification and examples. Since the instant invention contemplates the use of organo-metallic compounds in combination with transition metal salts and various oxygen and sulfurcontaining compounds, and since various factors or considerations will influence the optimum range of the three catalyst components in relation to each other, the molar ratios of the three components which optimize the polymerization conditions cannot be readily set forth. However, by following the various teachings found elsewhere and particularly in the examples of this application, those skilled in the art can readily determine the optimum molar range of the three catalyst components to each other. Obviously if one employs the oxygen or sulfur-containing compound, or as is designated above, component C in relatively large amounts, the activity of the catalyst will be reduced considerably or even destroyed.

It has been found that good results are obtained in the practice of this invention when the molar relationship between the three catalyst components, A, B, and C, as previously defined, are within a molar ratio of B/C ranging from about 0.3/1 to at least about 20/1 and the molar ratio of A/B is within the range of about 0.5/1 to at least 15/1. More preferred ratios are B/C of 0.5/1 to 5/1 and A/B of 0.5/1 to 8/1. Still more preferred ratios are B/C of 1/1 to 2/1 and A/B of 0.75/1 to 5/1.

The catalysts employed in this invention are prepared by mixing the components by known techniques. Thus, the catalysts may be prepared by "preformed" or "in situ" techniques. By the preformed method the catalyst components are mixed together prior to exposure of any of the catalyst components to the monomer to be polymerized. In the in situ method the catalyst components are added separately to the monomer to be polymerized. The catalyst components may be mixed either as pure compounds or as suspensions or solutions in liquids which do not adversely affect polymerization.

While the presence of the monomer is not essential during the formation of active catalyst by a mixing of components A, B, and C and this fact facilitates the use of preformed catalysts, it has been found that freshly preformed catalysts are generally more active than catalysts which have been allowed to age before use.

The order of addition of the three catalyst components to each other is of interest in the practice of this invention. There are various methods in which the three catalyst components can be brought into contact with the monomer or monomer/solvent mixture. The following is a numerical listing of these various methods in which A, B, and C stand for the catalyst components as previously defined:

1. Simultaneous addition of A, B, and C.
2. C followed by A and B which were previously preformed.
3. A and B preformed followed by C.
4. A followed by B and C which were preformed.
5. B and C preformed followed by A.
6. B followed by A and C which were preformed.
7. A and C preformed followed by B.
8. A followed by B followed by C.
9. B followed by A followed by C.
10. C followed by B followed by A.
11. C followed by A followed by B.
12. B followed by C followed by A.
13. A followed by C followed by B.
14. Preformed A, B, and C which was prepared by adding A to B and C preformed.
15. Preformed A, B, and C which was prepared by adding B to A and C preformed.
16. Preformed A, B, and C which was prepared by adding C to A and B preformed.

Of these various procedures, Procedures 6, 7, 11, 13, and 15 listed above are methods of preparation which reduce somewhat the catalyst activity. The remaining of the listed procedures 1, 2, 3, 4, 5, 8, 9, 10, 12, 14, and 16 lead to the most active catalyst systems.

The amount of catalyst employed in the polymerizations of this invention may be varied over wide concentrations and has not been found to be critical. Of course, a catalytic amount of the catalyst must be employed. The optimum amount of catalyst depends on a number of factors such as temperature, reactants used, purity of reactants, reaction times desired and the like. Those skilled in the art will readily determine the optimum catalytic ranges. Polymerizations can be conducted wherein the amount of catalyst employed is about 0.01 parts by weight of B per 100 parts by weight of monomer employed with components A and C adjusted to yield a desirable atomic ratio of A/B/C.

Various unsaturated alicyclic compounds may be employed in the practice of this invention. As is mentioned before, unsaturated alicyclic compounds containing at least 4 and not more than 5 carbon atoms in the cyclic ring which contain one carbon-to-carbon double bond in the cyclic ring and unsaturated alicyclic compounds containing at least 8 carbon atoms in the cyclic ring which contain at least one carbon-to-carbon double bond in the cyclic ring are operable in this invention.

The preferred unsaturated alicyclic compounds of this invention are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of compounds having at least 8 carbon atoms in the cyclic ring and having from one to two double bonds in said ring are cyclooctene; 1,4- and 1,5-cyclooctadiene. Representative of compounds having nine carbon atoms and one to three double bonds in the ring are cyclononene, 1,4- and 1,5-cyclononadiene and 1,4,7-cyclononatriene. Representative of compounds having ten carbon atoms and one to three double bonds in the ring are cyclodecene, 1,4-, 1,5- and 1,6-cyclodecadiene and 1,4,6- and 1,4,7-cyclodecatriene. Representative of compounds having eleven carbon atoms and one to three double bonds in the ring are cycloundecene, 1,4-, 1,5- and 1,6-cycloundecadienes and 1,4,7- and 1,4,8-cycloundecatriene. Representative of compounds having twelve carbon atoms and one to three double bonds in the ring are cyclododecene, 1,4-, 1,5 -, 1,6- and 1,7-cyclododecadiene, and 1,4,7-, 1,4,8-, 1,4,9- and 1,5,9-cyclododecatriene.

The most preferred unsaturated alicyclic compounds of this invention are those containing from 1 to 3 carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, 1,5-cyclooctadiene, and 1,5,9-cyclododecatriene.

Still another class of preferred unsaturated alicyclic monomers are those containing one carbon-to-carbon double bond in the ring of at least 4 and not more than 5 carbon atoms, examples of which are cyclobutene and cyclopentene. Another group which are preferred are those which have at least 8 carbon atoms in the ring and not more than 12 carbon atoms in the ring and contain 1, 2, or 3 carbon-to-carbon double bonds in said ring, examples of which are previously set forth.

Representative examples of substituted unsaturated alicyclic compounds are alkyl-substituted compounds such as 1,5,9-trimethylcyclododecatriene; aryl-substituted compounds such as 3-phenylcyclooctene-1; aralkyl-substituted compounds such as 3-benzylcyclooctene-1; alkaryl-substituted compounds such as 3-methylphenylcyclooctene-1; halogen-substituted compounds wherein the halogens are iodine, chlorine, bromine, and fluorine such as 5-chlorocyclooctene-1, 3-bromocyclooctene-1, 5-chlorocyclododecene-1, and 5,6-dichlorocyclooctene-1. Mixtures of the unsaturated alicyclic compounds may bw polymerized including both substituted unsaturated alicyclic compounds and the unsubstituted unsaturated alicyclic compounds.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as tetralin; liquid aliphatic hydrocarbons such as pentane, heptane, hexane, petroleum ether, decane; and alicyclic hydrocarbons such as cyclohexane, decalin, and cyclooctane. Mixtures of such solvents may also be used.

Temperatures at which the polymerization reaction is carried out can be varied over a wide range. Usually the temperature can be varied from extremely low temperatures such as −60°C. up to high temperatures such as 150°C. or higher. Thus, the temperature is not a critical factor of the invention. It is generally preferred, however, to conduct the reaction at a temperature in the range of from about −20°C. to about 80°C. The pressure at which the polymerization is carried out can also be varied over a wide range. The reaction can be conducted at atmospheric pressure, or, if desired, it can be carried out at sub-atmospheric pressure or super-atmospheric pressure. Generally, a satisfactory polymerization is obtained when the reaction is carried out at about autogenous pressure developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In preforming the polymerizations of this invention, the introduction of the monomer, catalyst, and solvent, when a solvent is employed, can each be made to the reaction zone alternately, intermittently, and/or continuously.

It is thought that the polymerizations of this invention take place through a ring-opening polymerization mechanism. Such ring-opening polymerizations of unsaturated alicyclic compounds can be used to make a number of alternating copolymers and terpolymers that have not been capable of being made before. For example, the ring-opening polymerization of cyclooctene yields a polyoctenamer which may be considered the alternating copolymer of one butadiene unit and two ethylene units.

The ring-opening polymerization of cyclooctadiene-1,5 leads to a polybutenamer which is equivalent to the 1,4-addition polymer of butadiene-1,3. In practicing this invention, polybutenamers can be formed whose structure comprises alternating cis- and trans-vinylene groups in successive polymeric repeat units which is equivalent to the polymer which may be obtained by the 1,4-addition polymerization of butadiene-1,3 in which successive butadiene-1,3 units alternately occur in cis- and trans-configurations. Such a polymer could be considered an alternating copolymer of cis- and trans-1,4 poly(butadiene-1,3).

The ring-opening polymerization of 5-methylcyclooctene-1 would yield the alternating terpolymer of butadiene-1,3, propylene and ethylene; likewise, 5-phenylcyclooctene-1 would yield the alternating terpolymer of butadiene-1,3, styrene and ethylene. The ring-opening polymerization of 5-methylcyclooctadiene-1,5 would yield the alternating copolymer of butadiene-1,3 and isoprene. The ring-opening polymerization of substituted cyclododecenes can yield even more complicated alternating copolymers, terpolymers, and even quadripolymers.

Ring-opening polymerization also allows one to make copolymers and terpolymers that have not heretofore been made by ordinary addition polymerizations. A representative example of such a polymerization is the ring-opening polymerization of cyclononene which yields the perfectly alternating copolymer of butadiene-1,3 and pentamethylene.

Ring-opening polymerization of halogen-substituted unsaturated alicyclic monomers also leads to interesting copolymers and terpolymers; for instance, 5-chlorocyclooctene-1 would lead to a polymer equivalent to an alternating interpolymer of butadiene-1,3 plus vinyl chloride and ethylene; 3-bromocyclooctene-1 would yield a polymer equivalent to an alternating interpolymer of ethylene plus 1-bromobutadiene-1,3 and ethylene and 5-chlorocyclododecene-1 would lead to a polymer equivalent to an alternating interpolymer of butadiene-1,3 plus vinyl chloride and 3 ethylene molecules.

Ring-opening polymerization of unsaturated alicyclic hydrocarbons containing at least 4 and not more than 5 carbon atoms and containing one carbon-to-carbon double bond in the cyclic ring and those containing 8 carbon atoms and at least one carbon-to-carbon double bond in the cyclic ring produces high molecular weight polymers which have a high degree of resistance to oxidation.

Bulk polymerizations may be desirable from a process standpoint as relatively little heat appears to be evolved per mole of unsaturated alicyclic monomer polymerized in practicing this invention. This constitutes a great advantage for this ring-opening type of polymerization over conventional addition polymerization.

The low volume decrease accompanying a ring-opening polymerization is another major advantage over conventional addition polymerization, particularly where these monomers are bulk polymerized to form potting compounds and various articles, examples of which are molded plastic materials, molded rubber-like goods, shoe soles and heels, industrial belts, and vehicle tires.

In these applications the monomer may be polymerized in the presence of one or more reinforcing carbon blacks, pigments or resins and certain anti-oxidants. The products made by this procedure may be cross-linked by adding polymerizable polyfunctional compounds, for example, bicyclopentadiene, to the main monomer. The molded products made by ring-opening polymerization may be crosslinked by exposure to ionizing radiation such as gamma rays, x-rays, or electrons. These molded products may also be cross-linked or vulcanized by incorporating certain compounds which on heating during or subsequent to the polymerization will lead to conventional crosslinking or vulcanization of these polymers.

The polymerization reaction may be terminated by incorporating various compounds which upon heating release materials which deactivate the catalyst. Representative examples of such compounds are the ammonia salts such as ammonium chloride, ammonium carbonate, ammonium acetate, ammonium oleate, ammonium sulphate, and ammonium phosphate; other ammonia-releasing compounds such as tetraalkyl ammonium halides, e.g., tetramethyl ammonium chloride; water-releasing agents such as salts with water of crystallization, examples of which are: $Al_2(SO_4).17H_2O$; $NH_4Al(SO_4)_2.12H_2O$; $FeSO_4.7H_2O$; $MgHPO_4.7H_2O$; $KAl(SO_4)_2.12H_2O$; $KNaCO_3.6H_2O$; $Na_2B_4O_7.10H_2O$; $Na_2CO_3.10H_2O$; $NaHPO_4.12 H_2O$; $Na_2SO_4.10H_2O$ and $ZnNO_3.6H_2O$.

The following examples are set forth to further illustrate the nature of this invention. However, it should be understood that the examples are set forth for illustrative and not for limitative purposes. The parts and percentages are by weight unless otherwise indicated. All experiments were conducted in an atmosphere of nitrogen unless noted.

EXAMPLE 1

Commercial grade pentane, which had been purified by washing with sulphuric acid followed by a water wash and drying over silica gel, was used as a solvent. Cyclooctene which was freshly distilled over sodium was used as the monomer. The experiments were carried out in 4-ounce bottles which were dried at 120°C. for about 12 hours and cooled in a nitrogen atmosphere. Each bottle was charged with 25.5 grams (g) of cyclooctene and 70 milliliters (ml) of pentane of which 10 ml was vented by placing the bottles on a warm sand bath before each bottle was capped with a self-sealing gasket. The catalyst components were added in a manner that the oxygen-containing (C) component went in first followed by the tungsten component (B) followed by the organo-aluminum component (A). The (A) component was aluminum triisobutyl (TIBA) and was added as a 0.1 molar solution in heptane, and was used in an amount of $3.5 \times 10^{-4}$ mols per 25.5 g of cyclooctene. The (B) component was tungsten hexachloride ($WCl_6$) and was added as a 0.1 molar solution in toluene, and was used in amount of $4.5 \times 10^{-4}$ mols per 25.5 g of cyclooctene. Component (C), the oxygen-containing compound, was added with the aid of a micrometer syringe. The particular oxygen-containing compounds employed and the amounts used are set forth in column 2 in the table below. The polymerizations were conducted at room temperature (about 25°C.) and terminated after 20 hours with 5 ml of a benzene solution of tetraethylenepentamine (TEPA)

(0.1 molar) containing 6 grams of ditertiary butyl-para-cresol per 100 ml of solution. The resulting polymers were coagulated with isopropanol, dried and weighed.

The Al/W/O mol ratio is set forth in column 3 and the yield of solid polymer obtained is set forth in column 4 of the table below.

Table 1

| Exp. No. | Component C ($M \times 10^4$) | Al/W/O Mol Ratio | Yield(%) |
|---|---|---|---|
| 1 | 0.00 | 0.8/1.0/0.0 | 22.9 |
| | $H_2O$ - Water | | |
| 2 | 3.90 | 0.8/1.0/0.87 | 60.5 |
| 3 | 7.80 | 0.8/1.0/1.73 | 37.0 |
| 4 | 19.50 | 0.8/1.0/4.33 | 89.5 |
| 5 | 25.90 | 0.8/1.0/6.72 | 73.2 |
| 6 | 39.00 | 0.8/1.0/8.67 | 74.7 |
| 7 | 78.00 | 0.8/1.0/17.34 | 79.5 |
| 8 | 117.00 | 0.8/1.0/26.00 | 6.7 |
| | $C_2H_5OH$ - Ethyl Alcohol | | |
| 9 | 0.34 | 0.8/1.0/0.08 | 97.5 |
| 10 | 0.86 | 0.8/1.0/0.19 | 97.2 |
| 11 | 1.03 | 0.8/1.0/0.22 | 96.4 |
| 12 | 1.72 | 0.8/1.0/0.38 | 89.5 |
| 13 | 3.44 | 0.8/1.0/0.77 | 82.0 |
| 14 | 4.50 | 0.8/1.0/1.0 | 89.7 |
| | $CH_3OH$ - Methyl Alcohol | | |
| 15 | 1.50 | 0.8/1.0/0.33 | 65.5 |
| 16 | 2.50 | 0.8/1.0/0.56 | 70.0 |
| 17 | 5.0 | 0.8/1.0/1.11 | 73.5 |
| 18 | 7.5 | 0.8/1.0/1.67 | 70.0 |
| | $C_6H_5OH$ - Phenol | | |
| 19 | 0.10 | 0.8/1.0/0.022 | 80.4 |
| 20 | 0.20 | 0.8/1.0/0.045 | 65.8 |
| 21 | 0.80 | 0.8/1.0/0.178 | 65.3 |
| 22 | 1.10 | 0.8/1.0/0.245 | 51.0 |
| 23 | 2.20 | 0.8/1.0/0.490 | 50.8 |
| | $C_6H_5-C(CH_3)_2-OH$ - Cumyl Alcohol | | |
| 24 | 0.71 | 0.8/1.0/0.16 | 72.0 |
| 25 | 1.43 | 0.8/1.0/0.32 | 82.0 |

Table I—Continued

| Exp. No. | Component C (M x 10⁴) | Al/W/O Mol Ratio | Yield (%) |
|---|---|---|---|
| 26 | 2.86 | 0.8/1.0/0.63 | 86.0 |
| 27 | 4.28 | 0.8/1.0/0.95 | 89.0 |

$$C_6H_5-\underset{\underset{CH_3}{|}}{\overset{\overset{CH_3}{|}}{C}}-OOH \quad - \quad \text{Cumyl Hydroperoxide}$$

| Exp. No. | Component C (M x 10⁴) | Al/W/O Mol Ratio | Yield (%) |
|---|---|---|---|
| 28 | 1.30 | 0.8/1.0/0.29 | 20.5 |
| 29 | 2.93 | 0.8/1.0/0.65 | 67.5 |

$$\begin{array}{l} CH_2OH \\ |\\ CH-OH \\ | \\ CH_2OH \end{array} \quad - \quad \text{Glycerol}$$

| Exp. No. | Component C (M x 10⁴) | Al/W/O Mol Ratio | Yield (%) |
|---|---|---|---|
| 30 | 0.33 | 2.0/1.0/0.33 | 28.1 |
| 31 | 0.33 | 3.5/1.0/0.33 | 69.6 |
| 32 | 0.67 | 3.0/1.0/0.66 | 75.8 |
| 33 | 1.00 | 2.5/1.0/1.0 | 96.0 |

EXAMPLE 2

The general procedure, including the order of addition of the catalyst components, of Example 1 was followed. However, organo-aluminum chlorides were substituted for triisobutylaluminum as component A and the molar ratios of the aluminum/tungsten/oxygen-containing compound were varied as presented in the table below. The amount of organo-aluminum chloride employed was $2 \times 10^{-4}$ mols throughout the whole series of polyymerizations. The amount of tungsten hexachloride employed was $1 \times 10^{-4}$ mols throughout the whole series of polymerizations. Ethanol was employed as the oxygen-containing compound and the amounts are set forth in the table below. The polymerization temperature was about 25°C. and the polymerizations were conducted for 20 hours. The results are set forth in the table below.

TABLE 2

| Exp. No. | $C_2H_5OH$ (M × 10⁴) | Al/W/O Mol Ratio | Yield (%) |
|---|---|---|---|
| DIBAC (Diisobutylaluminum chloride) | | | |
| 1 | 0.00 | 2.0/1.0/0.0 | 4.3 |
| 2 | 0.17 | 2.0/1.0/0.17 | 26.3 |
| 3 | 0.51 | 2.0/1.0/0.51 | 59.4 |
| 4 | 0.85 | 2.0/1.0/0.85 | 71.5 |
| 5 | 1.02 | 2.0/1.0/1.02 | 33.8 |
| 6 | 1.74 | 2.0/1.0/1.74 | 79.2 |
| EADC (Ethylaluminum dichloride) | | | |
| 7 | 0.17 | 2.0/1.0/0.17 | 93.6 |
| 8 | 0.34 | 2.0/1.0/0.34 | 85.0 |
| 9 | 0.51 | 2.0/1.0/0.51 | 92.2 |
| 10 | 0.85 | 2.0/1.0/0.85 | 74.7 |
| 11 | 1.00 | 2.0/1.0/1.00 | 98.7 |

EXAMPLE 3

The general procedure of Example 1 was followed except that the $WCl_6$ and the particular oxygen-containing compound used were preformed at a W/O mol ratio of 1/1, and divided into three portions each of which was aged as follows: first, aged for 14 hours at room temperature; second, aged 14 hours at room temperature followed by 20 hours at 85°C.; and third, aged 17 days at room temperature. Sufficient amount of this preformed catalyst was employed to give $1 \times 10^{-4}$ mols of $WCl_6$ in combination with ethylaluminum dichloride. The polymerization in the present series was one hour at room temperature. The relevant data is given in the table below wherein in the column headed A are the results of the preformed catalyst which was aged for 14 hours at room temperature. In column B are the results of the catalyst which was aged for 14 hours at room temperature followed by 20 hours at 85°C., and in column C are the results of the catalyst which was aged 17 days at room temperature.

Table 3

| Exp.No. | Component C | Al/W/O Mol Ratio | A % Yield | B % Yield | C % Yield |
|---|---|---|---|---|---|
| | $CH_3OH$ - Methyl Alcohol | | | | |
| 1 | " | 1.0/1.0/1.0 | 69.8 | 35.7 | 70.0 |
| 2 | " | 1.5/1.0/1.0 | 84.9 | 90.0 | 14.6 |
| 3 | " | 2.0/1.0/1.0 | 95.2 | 33.4 | 0.5 |
| 4 | " | 2.5/1.0/1.0 | 100.0 | 18.4 | 33.4 |
| | $(CH_3)_2CHOH$ - Isopropyl Alcohol | | | | |
| 5 | " | 0.5/1.0/1.0 | 29.8 | - | 46.1 |
| 6 | " | 1.0/1.0/1.0 | 49.4 | 30.4 | 35.8 |
| 7 | " | 1.5/1.0/1.0 | 62.2 | 38.6 | 31.4 |
| 8 | " | 2.0/1.0/1.0 | 78.7 | 10.3 | 37.2 |
| 9 | " | 2.5/1.0/1.0 | 82.0 | 8.1 | 32.7 |
| | $(CH_3)_3COH$ - Tertiary Butyl Alcohol | | | | |
| 10 | " | 0.5/1.0/1.0 | 16.6 | - | 37.9 |
| 11 | " | 1.0/1.0/1.0 | 65.8 | 23.0 | 34.6 |
| 12 | " | 1.5/1.0/1.0 | 79.5 | 80.7 | 36.4 |
| 13 | " | 2.0/1.0/1.0 | 72.3 | 74.5 | 40.6 |
| 14 | " | 2.5/1.0/1.0 | 64.5 | 11.6 | 68.1 |
| | $CH_2=CH-CH_2OH$ - Allyl Alcohol | | | | |
| 15 | " | 0.5/1.0/1.0 | 40.8 | - | 37.0 |
| 16 | " | 1.0/1.0/1.0 | 64.2 | 27.1 | 40.5 |
| 17 | " | 1.5/1.0/1.0 | 51.5 | 77.0 | 36.2 |
| 18 | " | 2.0/1.0/1.0 | 45.0 | 31.1 | 31.9 |
| 19 | " | 2.5/1.0/1.0 | 61.6 | 10.6 | 25.1 |
| | $C_6H_5OH$ - Phenol | | | | |
| 20 | " | 0.5/1.0/1.0 | 1.7 | - | 9.5 |
| 21 | " | 1.0/1.0/1.0 | 45.0 | 1.5 | 32.6 |
| 22 | " | 1.5/1.0/1.0 | 64.3 | 5.0 | 42.4 |
| 23 | " | 2.0/1.0/1.0 | 88.0 | 90.5 | 44.0 |
| 24 | " | 2.5/1.0/1.0 | 96.7 | 68.5 | 92.3 |

Table 3—Continued

| Exp.No. | Component C | Al/W/O Mol Ratio | A % Yield | B % Yield | C % Yield |
|---|---|---|---|---|---|
| | $C_6H_5CH_2OH$ – Benzyl Alcohol | | | | |
| 25 | " | 0.5/1.0/1.0 | 45.6 | – | 40.1 |
| 26 | " | 1.0/1.0/1.0 | 50.4 | 5.3 | 42.7 |
| 27 | " | 1.5/1.0/1.0 | 64.2 | 14.4 | 32.5 |
| 28 | " | 2.0/1.0/1.0 | 33.3 | 5.3 | 51.3 |
| 29 | " | 2.5/1.0/1.0 | 50.0 | 4.8 | 42.6 |

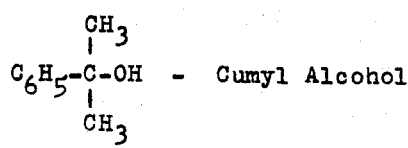

Cumyl Alcohol

| Exp.No. | Component C | Al/W/O Mol Ratio | A % Yield | B % Yield | C % Yield |
|---|---|---|---|---|---|
| 30 | " | 0.5/1.0/1.0 | 0.8 | – | 0.5 |
| 31 | " | 1.0/1.0/1.0 | 57.2 | 38.5 | 42.1 |
| 32 | " | 1.5/1.0/1.0 | 60.5 | 80.9 | 17.4 |
| 33 | " | 2.0/1.0/1.0 | 45.6 | 29.6 | 35.5 |
| 34 | " | 2.5/1.0/1.0 | 51.9 | 85.0 | 71.8 |

EXAMPLE 4

The general procedure of Example 1 was employed except that $WCl_6$ and ethanol were preformed at a ratio of 1/1 and a ratio of 1/0.5 followed by the particular organo aluminum component. The amount of $WCl_6$ + $C_2H_5OH$ used in Runs 1–14 was $1 \times 10^{-4}$ mols and the amount of $WCl_6$ + $0.5C_2H_5OH$ in Runs 15–24 was also $1 \times 10^{-4}$ mols. The polymerization conditions were one hour at about 25°C. The relevant data is in the table below.

TABLE 4

| Exp. No. | Component A | Al/W/O Mol Ratio | Yield (%) |
|---|---|---|---|
| | $(C_2H_5)_3Al_2Cl_3$ —Ethylaluminum sesquichloride | | |
| 1 | do. | 0.5/1.0/1.0 | 0.74 |
| 2 | do. | 0.7/1.0/1.0 | 72.10 |
| 3 | do. | 1.0/1.0/1.0 | 81.20 |
| 4 | do. | 1.5/1.0/1.0 | 96.0 |
| 5 | do. | 2.0/1.0/1.0 | 97.0 |
| 6 | do. | 2.5/1.0/1.0 | 43.0 |
| 7 | do. | 5.0/1.0/1.0 | 5.1 |
| | $(C_2H_5)_2AlCl$ —Diethylaluminum chloride | | |
| 8 | do. | 0.5/1.0/1.0 | 33.0 |
| 9 | do. | 0.7/1.0/1.0 | 86.0 |
| 10 | do. | 1.0/1.0/1.0 | 96.4 |
| 11 | do. | 1.5/1.0/1.0 | 58.7 |
| 12 | do. | 2.0/1.0/1.0 | 20.8 |
| 13 | do. | 2.5/1.0/1.0 | 6.6 |
| 14 | do. | 5.0/1.0/1.0 | 3.1 |
| | $(C_2H_5)_3Al_2Cl_3$ —Ethylaluminum sesquichloride | | |
| 15 | do. | 0.5/1.0/0.5 | 45.5 |
| 16 | do. | 1.0/1.0/0.5 | 83.5 |
| 17 | do. | 1.5/1.0/0.5 | 90.1 |
| 18 | do. | 2.0/1.0/0.5 | 15.3 |
| 19 | do. | 4.0/1.0/0.5 | 10.2 |
| | $(C_2H_5)_2AlCl$ —Diethylaluminum chloride | | |
| 20 | | 0.5/1.0/0.5 | 58.5 |
| 21 | | 1.0/1.0/0.5 | 64.9 |
| 22 | | 1.5/1.0/0.5 | 19.6 |
| 23 | | 2.0/1.0/0.5 | 5.0 |
| 24 | | 4.0/1.0/0.5 | 2.0 |

EXAMPLE 5

Eight 0.05 molar solutions of $WCl_6$ in benzene were reacted with ethanol at a molar ratio of W/O of 1/1 for several hours under nitrogen. The dark-blue color of the solution turned to dark red. These $WCl_6$-ethanol solutions were further reacted with ethylaluminum dichloride to form catalysts with Al/W molar ratios of 0.5, 1.0, 2.0, 3.0, 5.0, 8.0, and 15.0. These preformed catalyst solutions, after they had been aged for different intervals, were than employed to polymerize 25.5 grams of cyclooctene at catalyst levels of $2.0 \times 10^{-4}$ mols of $WCl_6$. Several of the runs were activated after one hour by an additional amount of ethylaluminum dichloride. These are indicated in column 3 below. The polymerization conditions were 24 hours at room temperature.

TABLE 5

| Exp. No. | Al/W/O | EADC (M × 10⁴) | Yield (%) |
|---|---|---|---|
| | 3 hours catalyst aging | | |
| 1 | 0.5/1.0/1.0 | 2.0 | 88.6 |
| 2 | 1.0/1.0/1.0 | 2.0 | 77.7 |
| 3 | 2.0/1.0/1.0 | — | 27.4 |
| 4 | 3.0/1.0/1.0 | — | 72.9 |
| 5 | 5.0/1.0/1.0 | — | 98.2 |
| 6 | 8.0/1.0/1.0 | — | 100.0 |
| 7 | 12.0/1.0/1.0 | — | 44.1 |
| 8 | 15.0/1.0/1.0 | — | 45.5 |
| | 48 hours catalyst aging | | |
| 9 | 0.5/1.0/1.0 | 2.0 | 93.4 |
| 10 | 1.0/1.0/1.0 | 2.0 | 82.8 |
| 11 | 3.0/1.0/1.0 | — | 61.6 |
| 12 | 5.0/1.0/1.0 | — | 100.0 |
| 13 | 8.0/1.0/1.0 | — | 91.3 |
| 14 | 12.0/1.0/1.0 | — | 98.3 |

TABLE 5-Continued

| Exp. No. | Al/W/O | EADC (M × 10⁴) | Yield (%) |
|---|---|---|---|
| | 120 hours catalyst aging | | |
| 15 | 2.0/1.0/1.0 | — | 15.0 |
| 16 | 3.0/1.0/1.0 | — | 47.5 |
| 17 | 5.0/1.0/1.0 | — | 79.0 |
| 18 | 8.0/1.0/1.0 | — | 79.5 |
| 19 | 12.0/1.0/1.0 | — | 59.0 |

EXAMPLE 6

A series of polymerizations were carried out following the procedure described in Example 1 except that 17 grams of cyclooctene were employed with 80 milliliters of various solvents. The catalyst employed was a preformed complex of $WCl_6$ and ethanol at a W/O ratio of 1/1 and was employed at a level of $1 \times 10^{-4}$ mols each of $WCl_6$ and ethanol. Ethylaluminum dichloride was added last as component A at a level of $2 \times 10^{-4}$ mols. The polymerization time was 1 hour at about 25°C.

Table 6

| Exp. No. | Solvent | Yield (%) | Inherent Viscosity (dl/g) |
|---|---|---|---|
| 1 | Benzene | 84.8 | 2.59 |
| 2 | Toluene | 36.6 | 1.38 |
| 3 | Cyclohexane | 84.2 | 1.57 |
| 4 | Chlorobenzene | 4.0 | 0.43 |
| 5 | Hexane | 80.9 | 1.70 |
| 6 | Pentane | 78.4 | 2.87 |

EXAMPLE 7

A polymerization bottle was charged with 80 ml. dry pentane, 8.5 g. cyclooctene and 8.8 g. 1,5-cyclooctadiene which were freshly distilled over sodium. After venting about 10 ml. solvent on the sand bath $1 \times 10^{-4}$ mols each of preformed [$WCl_6$ + $C_2H_5OH$] complex in benzene solution was charged followed by $2 \times 10^{-4}$ mols of ethylaluminum dichloride, thus maintaining an Al/W/O molar ratio of 2.0/1.0/1.0. The copolymerization was carried out for 24 hours at room temperature. Termination and product isolation were done as described in Example 1. A yield of 99.1 percent solid copolymer was obtained.

EXAMPLE 8

Similar to Example 7 except that the monomers which were copolymerized were cyclooctene and 1,5,9-cyclododecatriene. The Al/W/O molar ratio applied in this experiment was 2.5/1.0/0.5. The yield after 24 hours polymerization at room temperature was 67.0 percent solid copolymer.

EXAMPLE 9

The polymerization of cyclooctene similar to that of Example 4 was conducted except diethyl zinc was employed as component A in the catalyst combination. The Zn/W/O molar ratio was 1/1/0.9. A yield of 7.5 percent solid polymer was obtained after 1 hour at 25°C.

EXAMPLE 10

An experiment similar to Example 1 was conducted except that thiophenol was employed as component C. The thiophenol in an amount of $1 \times 10^{-4}$ mols, $WCl_6$ in an amount of $1 \times 10^{-4}$ mols and ethylaluminum dichloride in an amount of $2 \times 10^{-4}$ mols was added to a polymerization vessel containing 25.5 grams of cyclooctene and 70 ml of pentane. After a polymerization time of 24 hours at room temperature a yield of 43.4 percent solid polymer was obtained which had an inherent viscosity of 1.1 dl/g and a 39 percent transvinylene content.

EXAMPLE 11

An experiment identical to that of Example 10 was conducted except that tertiary nonyl thiol was employed instead of thiophenol and was used at $0.5 \times 10^{-4}$ mols. The yield of 77 percent solid polymer was obtained which had an inherent viscosity of 1.42 dl/g and a 42 percent trans-vinylene content.

EXAMPLE 12

A four-ounce bottle which had been dried at 120°C. for 12 hours and cooled to room temperature under a stream of nitrogen was charged with 70 milliliters of freshly distilled cyclooctene. Tungsten hexachloride and ethyl alcohol were preformed at a W/O molar ratio of 1/1. An amount of this preformed tungsten hexachloride-ethyl alcohol mixture to give $1 \times 10^{-4}$ mols of each was injected into the bottle followed by $2 \times 10^{-4}$ mols of ethylaluminum dichloride. Within a few seconds the material in the bottle turned viscous and after two minutes at room temperature the contents of the bottle had been converted to a solid mass. After approximately 10 minutes the bottle was broken and a solid piece of rubber of the same shape as the bottle was obtained.

While certain representative embodiments and details have been shown for the purpose of illustrating the invention, it will be apparent to those skilled in this art that various changes and modifications may be made therein without departing from the spirit or scope of the invention.

What is claimed is:

1. A polymerization process comprising polymerizing at least one unsaturated alicyclic compound selected from the group consisting of (1) unsaturated alicyclic compounds containing 4 or 5 carbon atoms in the cyclic ring and containing 1 carbon-to-carbon double bond in the cyclic ring, and (2) unsaturated alicyclic compounds containing at least 8 carbon atoms in the cyclic ring and containing at least 1 carbon-to-carbon double bond in the cyclic ring, by subjecting said alicyclic compounds to polymerization conditions in the presence of a catalyst system comprising (a) at least one organometallic compound wherein the metal is selected from the group consisting of Ia, IIa, IIb and IIIa of the Periodic Table of Elements, (b) at least one metal salt wherein the metal is selected from the group consisting of molybdenum and tungsten and (c) at least one compound of the general formula R-S-H wherein R is a radical selected from the group consisting of (1) hydrogen, (2) alkyl, (3) aryl, (4) arylalkyl, (5) alkaryl, (6) alkenyl (7) thioalkyl, thioaryl and thioalkaryl and radicals of (2) through (6) wherein at least one hydrogen is substituted by thiol (SH) and wherein the relationship between these three catalyst components defined by (a), (b) and (c) are within a molar ratio of (b)/(c) ranging from 0.3/1 to at least 20/1 and the molar ratio of (a)/(b) is within the range from about 0.5/1 to at least about 15/1.

2. The process according to claim 1 in which the (b) catalyst component is a halide of tungsten.

3. The process according to claim 1 in which the (a) catalyst component is an organoaluminum compound.

4. The process according to claim 1 in which the (c) catalyst component is a mercaptan.

5. The process according to claim 1 in which the unsaturated alicyclic compound contains from 4 to 5 carbon atoms and only one carbon-to-carbon double bond in the cyclic ring.

6. The process according to claim 1 in which the unsaturated alicyclic compound contains 8 and not more than 12 carbon atoms in the cyclic ring and contains from 1 to 3 carbon-to-carbon double bonds in the cyclic ring which are located in relation to each other that they are not conjugated.

7. The process according to claim 1 in which a mixture of cyclooctene and 1,5-cyclooctadiene are copolymerized.

8. The process according to claim 1 in which cyclooctadiene is homopolymerized.

9. The process according to claim 1 in which the polymerization is conducted in bulk.

* * * * *